(12) United States Patent
Henderson et al.

(10) Patent No.: US 6,266,918 B1
(45) Date of Patent: Jul. 31, 2001

(54) POP-UP TERMITE INDICATOR

(75) Inventors: Gregg Henderson, St. Gabriel; Jay K. Paxson, Baton Rouge, both of LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 09/512,723

(22) Filed: Feb. 24, 2000

(51) Int. Cl.$^7$ .................................................. A01M 1/20
(52) U.S. Cl. ............................ 43/131; 43/124; 43/132.1; 73/587
(58) Field of Search ............................ 43/111, 124, 131, 43/132.1; 73/587

(56) References Cited

U.S. PATENT DOCUMENTS

| | | | |
|---|---|---|---|
| 3,564,750 | * 2/1971 | Burgess | 43/107 |
| 4,895,025 | * 1/1990 | Betts | 73/587 |
| 5,285,688 | * 2/1994 | Robbins | 73/587 |
| 5,329,726 | 7/1994 | Thorne et al. | 43/124 |
| 5,571,967 | 11/1996 | Tanaka et al. | 73/587 |
| 5,592,774 | 1/1997 | Galyon | 43/124 |
| 5,832,658 | 11/1998 | Randon | 43/131 |
| 5,877,422 | 3/1999 | Otomo | 73/587 |
| 5,899,018 | 5/1999 | Gordon et al. | 43/131 |
| 5,901,496 | 5/1999 | Woodruff | 43/124 |
| 5,950,356 | 9/1999 | Nimocks | 43/131 |
| 6,052,066 | * 4/2000 | Su | 340/573 |
| 6,100,805 | * 8/2000 | Lake | 43/132.1 |

* cited by examiner

Primary Examiner—Kurt Rowan
(74) Attorney, Agent, or Firm—Bonnie J. Davis; John H. Runnels (57) ABSTRACT

A simple, inexpensive signal device indicates the presence of wood-destroying insects, particularly subterranean termites. The signal device comprises a triggering mechanism and a signaling mechanism. The device can be adapted to fit almost all commercially available monitors or bait stations. The triggering mechanism is designed to be released upon destruction by feeding by termites or other wood-eating insects. Upon release, the triggering mechanism is designed to either pull or push a visual signal out of the housing, producing a signal that can be seen from a distance. Using this signal device, the presence of termites can be detected without disturbing the monitor or bait station. Moreover, because the signal is seen outside the housing, the housing is not required to be transparent.

24 Claims, 6 Drawing Sheets

POP-UP TERMITE INDICATOR

This invention pertains to a device for detecting and signaling the presence of wood-destroying insects, especially termites. In particular, it is directed to a mechanical device that displays a visual signal outside the housing of a monitor or bait station when a trigger is released by the feeding activity of wood-destroying insects.

The Formosan subterranean termite, *Coptotermes formosanus* Shiraki, is a major world-wide pest, known to attack living trees and structural wood. *C. formosanus* is a native to southeast Asia and can be found in Hawaii, Guam, Brazil, Midway Island, Sri Lanka, and Africa. *C. formosanus* was first discovered in the United States in 1965. The largest single locus of *C. formosanus* in the U.S. is located in south Louisiana, with heavy infestations in Lake Charles and New Orleans.

The detection and eradication of Formosan termites and other termites is a major problem. For many years, homeowners and pest-control operators applied toxic poisons at ground level in and around foundation structures where termites could be expected. However, this method had the potential to cause short and long term health problems and to damage the surrounding environment.

One of the newer, safer methods to control termites is to confine the toxins to bait stations that are placed around a structure (either above or below ground), forming interception points near suspected areas of infestation. Termites are lured to the bait station with foods or attractants, for example, a cellulose source. The termites attack the bait and carry the termiticides back to the colony. Although this method can be effective in killing both foraging and non-foraging termites, it is expensive, both because of the number of bait stations required and because of the need to periodically inspect and replace each station.

Currently, the most effective and inexpensive method to control termites is initially to use monitors without toxins to detect the presence of termites. Only after a termite infestation has been detected are the more expensive, toxic bait stations placed in the proximity of the infestation. This method targets the infested area and uses fewer bait stations.

The current technology for detecting termites inside a monitor or bait station either involves expensive signaling mechanisms, usually electrical, or involves visually looking into the monitor or bait station, either through a transparent housing or by opening a lid and pulling out the bait. Visual inspection may disrupt the device by pulling it from the ground or by opening the lid. When termites are so disturbed, they often leave the area and may even leave a pheromone warning for other termites to avoid the area. See U.S. Pat. No. 5,899,018. If the housing is transparent and the monitor or bait station is placed above ground, then light will enter the device. Because termites avoid the light, this device would not be as attractive to termites as a monitor with a dark or opaque housing.

There is a need for a way to detect the presence of termites that is simple and inexpensive and that does not require either disturbing the termites or a transparent housing.

U.S. Pat. No. 5,592,774 describes a multi-chambered device that detects the presence of subterranean termites. The device uses at least two chambers, with one chamber impermeable to termites. Ambient environmental changes (e.g., moisture, methane gas, or pH) between the impermeable chamber and the chambers open to termites are monitored by an external detector. The data collected from each chamber are recorded on site or are transferred to an off-site computer. By comparing the two sets of data, the presence and the degree of infestation by termites can be determined.

U.S. Pat. No. 5,571,967 describes a device for the detection of termites, which comprises a damp wood sample, a detection terminal, an electrical circuit, and a magnetic or vibration sensor. The device is partially buried so that the wood sample is below the surface, but the upper portion containing the detection termal and magnetic circuit is above ground. As the wood sample is destroyed by termites, the floating detection terminal sinks into the wood sample and opens a circuit, which sends an electric signal to a monitoring center. Additionally, the lowering of the detection terminal can be visually monitored by looking through a window on the side of the upper portion of the housing.

U.S. Pat. No. 5,832,658 describes a device that attaches to structural surfaces to attract and detect the presence of wood-destroying insects. The non-toxic monitoring device has a transparent housing, which is periodically inspected for the presence of insects. Once insects are seen through the housing, the non-toxic bait material may be inoculated with a poisonous substance or replaced with a toxic bait material.

U.S. Pat. No. 5,899,018 describes a device for detecting and controlling subterranean termites, having a transparent housing with an opening in the bottom and an interior chamber which contains a moisture-absorbing attractant, for example, rolled cardboard. The device is partially buried such that the upper portion receives heat from the sun. During the day, the attractant material is heated and absorbs moisture from the soil. At night, the attractant releases moisture into the soil as the attractant cools, creating a temperature anomaly, which attracts termites. The device is periodically inspected by looking through the transparent upper portion. When termites are seen, a poisonous bait can be inserted into the interior chamber.

U.S. Pat. Nos. 5,901,496 and 5,329,726 describe devices for detecting termite activity, having an outer housing which is permanently buried, an inner housing containing a bait material, and a cover. After burying the outer housing, the inner housing with the bait is placed inside, aligning the openings so that termites may enter the inner housing. To inspect for termites, the inner housing is removed from the outer housing.

U.S. Pat. No. 5,877,422 describes a device comprising an alarm device, a relay device, and a detection apparatus. The detection apparatus electrically senses the presence of termites when the termites pass through openings connecting two internal chambers. This electrical signal is sent to a relay device, which in turn sends a signal to a monitoring center.

U.S. Pat. No. 5,950,356 describes a device for detecting and controlling termites that attaches non-toxic bait material to the interior walls of the housing. The device is buried such that the top is at ground level. The device is inspected at regular intervals for the presence of termites by removing the cover and observing the bait material. Upon detection of termites, a toxic bait material can be introduced without removing the non-toxic bait material.

We have discovered a simple, inexpensive signal device to detect and indicate the presence of wood-destroying insects, particularly subterranean termites. The signal device comprises a triggering mechanism and a signaling mechanism. The simple device can be adapted to fit almost all commercially available monitors or bait stations. The triggering mechanism is designed to be released upon destruction by feeding of termites or other wood-eating insects. Upon release, the triggering mechanism is designed to either pull or push a visual signal out of the housing, producing a signal that can be seen from a distance. Using this signal device, the presence of termites can be detected without disturbing the monitor or bait station. Moreover, because the signal is seen outside the housing, the housing need not be transparent.

The purpose of this invention is to provide a simple, inexpensive, visual means for detecting termites that are feeding on a monitor or a bait station, without having either to disturb the soil around the station or to look inside the housing. The device may be buried level with the ground, slightly under the ground, or placed above ground. The signal device is designed to trigger a visual signal that pops above the housing when termites have eaten and sufficiently weakened the triggering mechanism.

This visual signal can be seen from a distance. Thus termites can inexpensively be detected without disturbing the termites and without the requirement of a transparent housing.

Figure 1:
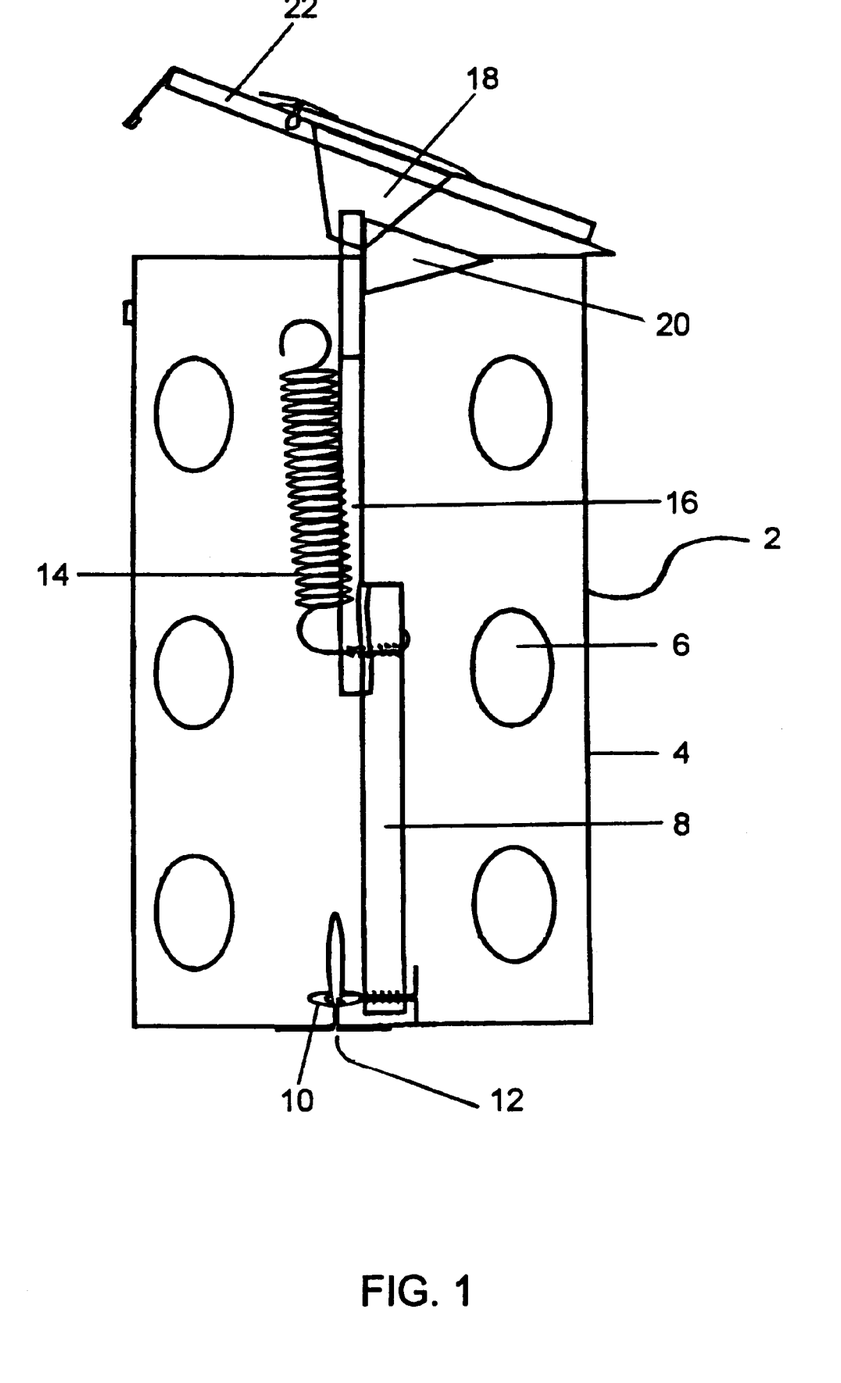
FIG. 1 illustrates a side, cut-away view of a pull-up embodiment of the signal device inside a monitor, prior to closing the lid and setting the triggering mechanism, which is designed to pull the visual indicator above the housing.
Figure 2:
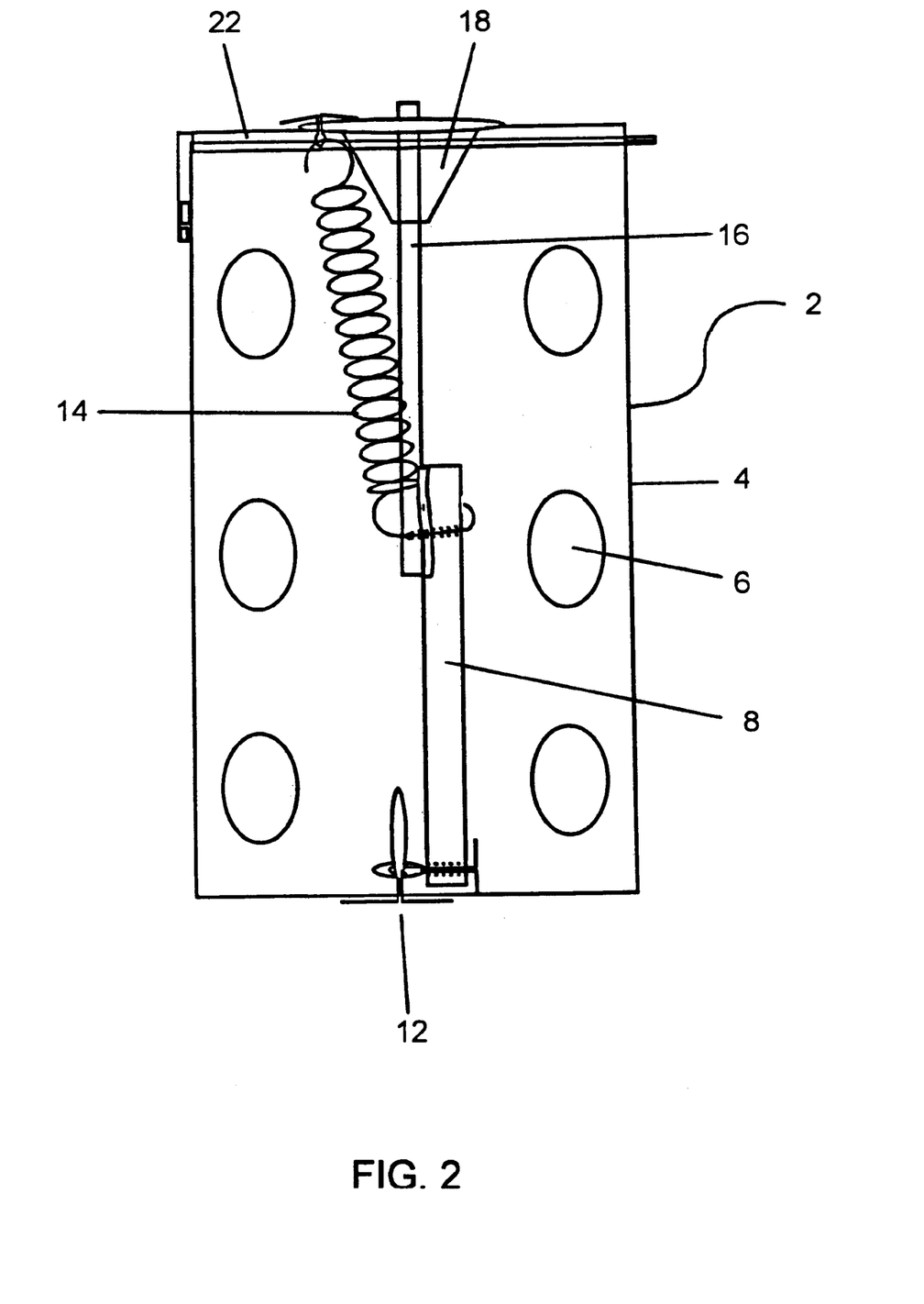
FIG. 2 illustrates a side, cut-away view of the pull-up embodiment of the signal device inside a monitor after setting the triggering mechanism.
Figure 3:
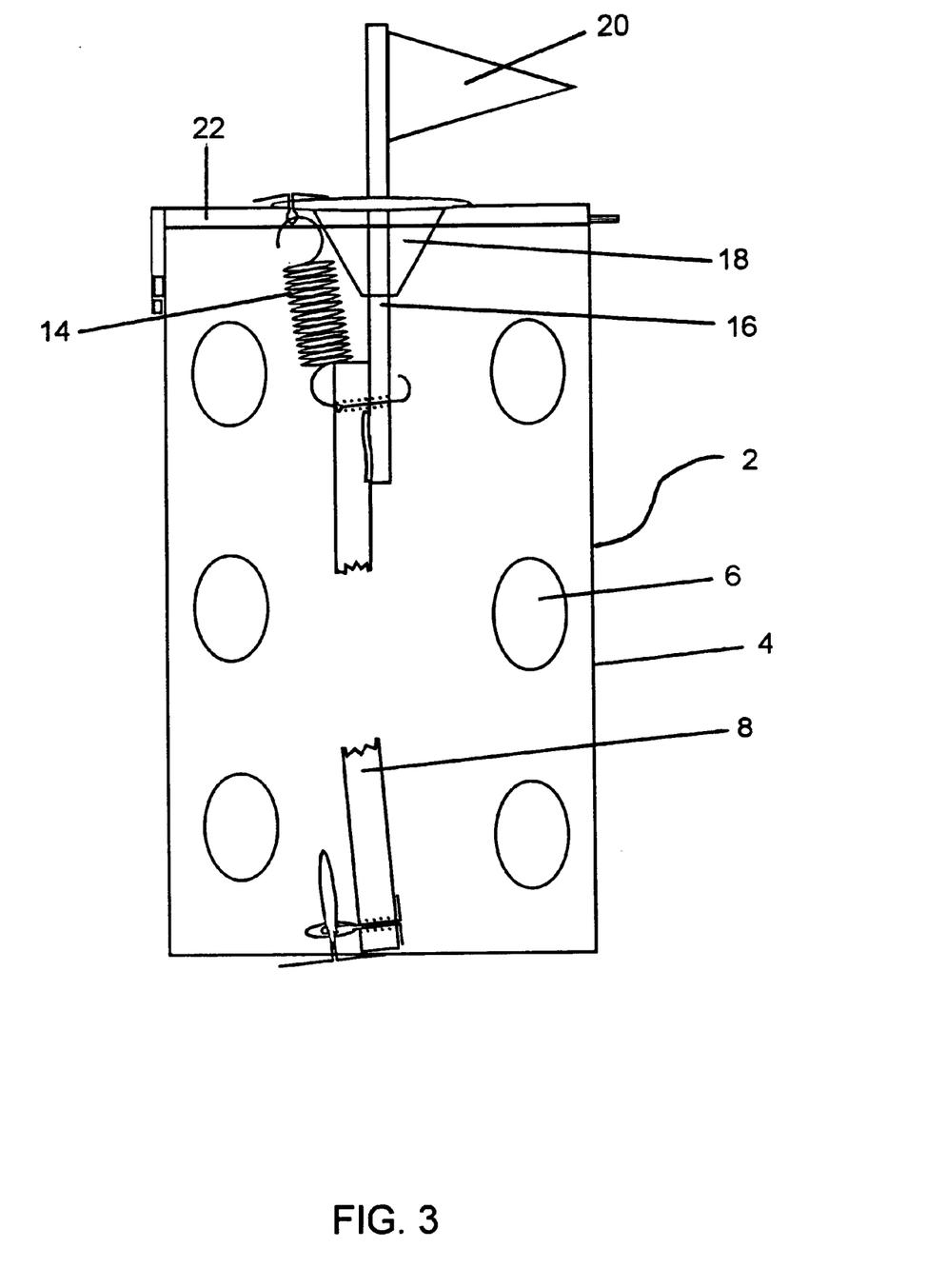
FIG. 3 illustrates a side, cut-away view of the pull-up embodiment of the signal device inside a monitor once the signal device has been triggered by termites eating through the food trigger.
Figure 4:
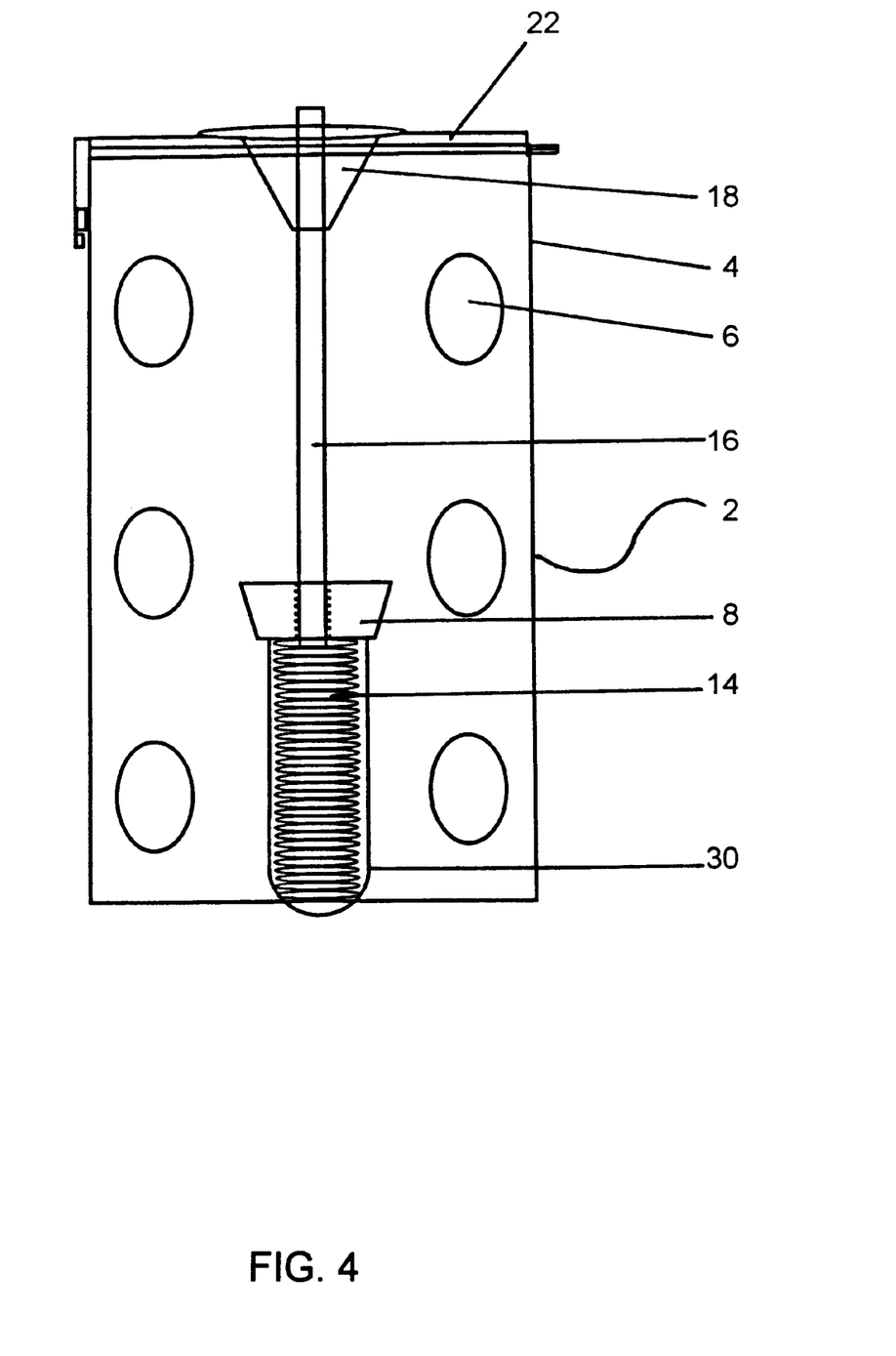
FIG. 4 illustrates a side, cut-away view of a push-up embodiment of the signal device inside a monitor after setting the triggering mechanism, which is designed to push the visual indicator above the housing.
Figure 5:
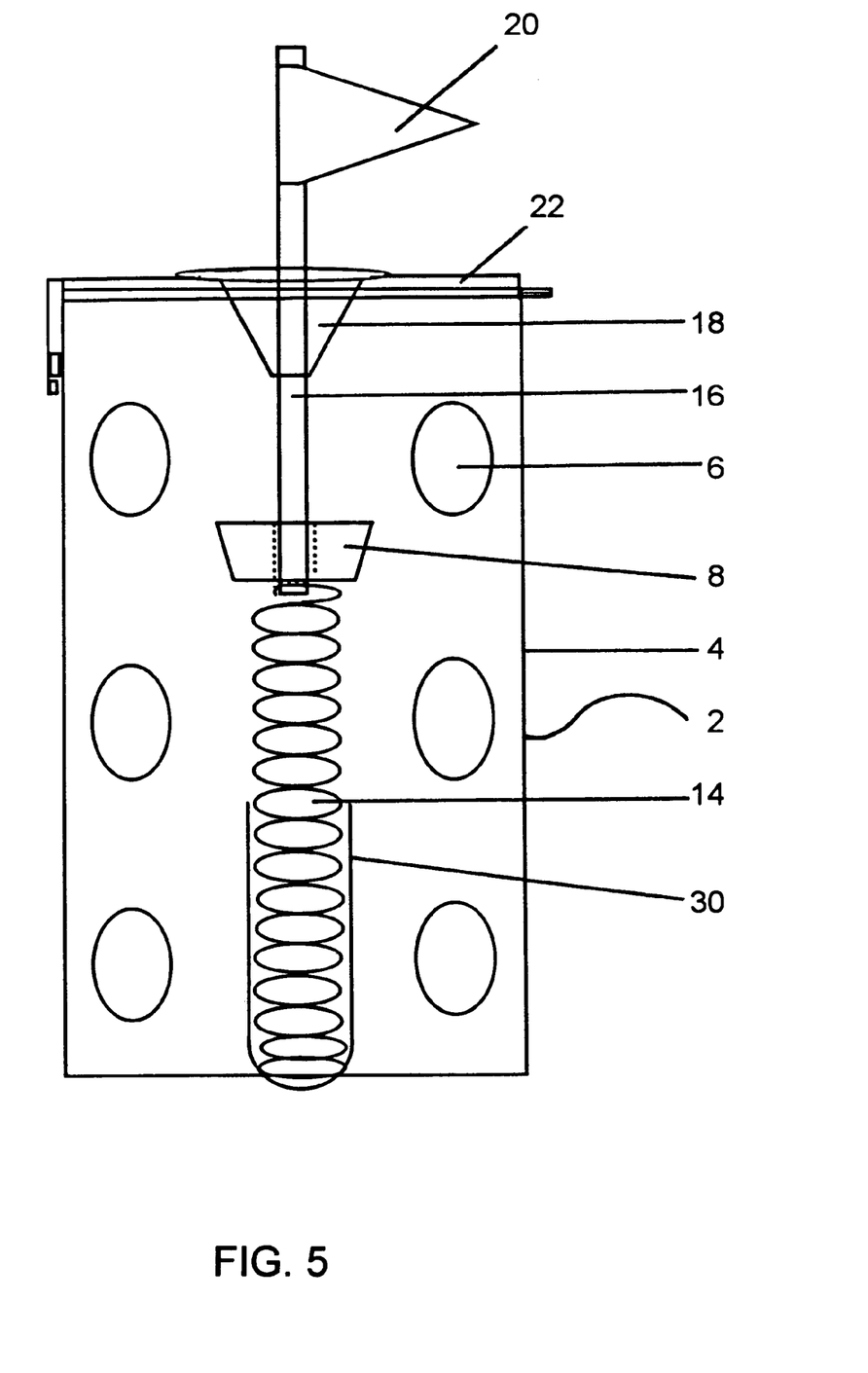
FIG. 5 illustrates a side, cut-away view of a push-up embodiment of the signal device inside a monitor once the signal device has been triggered by termites eating through the food trigger.

FIGS. 1–6 illustrate embodiments of the signal device placed in a monitor with a cylindrical housing (6.5 cm in diameter and 11 cm in length). It will be obvious to those skilled in the art that the signal device can be designed to fit housings with different shapes and sizes. FIGS. 1–3 illustrate a signal device with a triggering mechanism designed to pull the visual indicator up through the lid of the housing, while FIGS. 4–5 illustrate a triggering mechanism designed to push the visual indicator up through the lid.

FIG. 1 illustrates a side, cut-away view of monitoring station 2 which has been fitted with a pull-up signal device which has not yet been set. Not shown in FIG. 1 is a main food bait for the termites which is placed around the other components described below. (See FIG. 6) Housing 4 of monitor 2 has holes 6 allowing termites to enter. Housing 4 has a covering or lid 22. The signal device comprises visual indicator 20, signal support 16, elastic member 14, and food trigger 8. Food trigger 8 is anchored to monitor housing 4, for example, by cotter-pin 10 inserted through the eye of another cotter-pin 12 placed through a hole in the bottom of housing 4, as shown. Food trigger 8 is most preferably wood, preferably cut with the grain running perpendicular to direction of the pull exerted by elastic member 14. The top of food trigger 8 is securely attached to elastic member 14, preferably an extension spring. Signal support 16 is also securely attached near the top of food trigger 8. Signal support 16 is made of a material that is not usually eaten by termites, for example, plastic. At the top of signal support 16 is visual indicator 20, for example, bright-colored paint, a reflector, or a bright flag, as shown. The top of signal support 16 extends into guide 18 located in lid 22 of housing 4. Elastic member 14 is energized by attaching to lid 22 and exerts an upward pull on food trigger 8 when lid 22 is closed, as in FIG. 2.

FIG. 2 illustrates a side, cut-away view of monitor 2 after the signal device has been set and lid 22 has been closed. Elastic member 14 is now connected to lid 22 and is exerting an upward pull on food trigger 8.

FIG. 3 illustrates a side, cut-away view of a signal device that has been triggered by termites eating the food trigger 8. When food trigger 8 is sufficiently weakened to come apart as illustrated in FIG. 3, elastic member 14 relaxes and returns to its original shape, exerting an upward force on signal support 16 and pulling it up through guide 18 and lid 22. Signal support 16 is of sufficient length that, once triggered, visual indicator 20 is sufficiently above lid 22 that the signal can be seen at a distance. Thus the presence of termites can be visually detected without disturbing the soil and without looking through the housing.

FIGS. 4–5 illustrate a push-up signal device with a triggering mechanism designed to push the visual indicator 20 up through lid 22. The differences in this embodiment from the above description is that elastic member 14 is energized by compressing, rather than by extending. Elastic member 14 is attached inside tubular casing 30, which is attached to the bottom of housing 4. Both attachments may be accomplished with glue. Elastic member 14, preferably a compression spring in this embodiment, is kept compressed by attaching food trigger 8, which is preferably a block of wood, to the top rim of tubular casing 30, using, for example, glue. The glue must be strong enough to withstand the upward force of elastic member 14. Signal support 16 is attached to either food trigger 8 or elastic member 14, or both, as shown. Once termites enter housing 4 and begin to feed on food trigger 8, the bond between food trigger 8 and tubular casing 30 will weaken. Eventually, the bond will break releasing compressed elastic member 14, allowing elastic member 14 to relax and return to its original shape, as shown in FIG. 5. Such relaxation of elastic member 14 pushes the top of signal support 16 upward through lid 22, which results in the signal being seen above housing 4.

Figure 6:
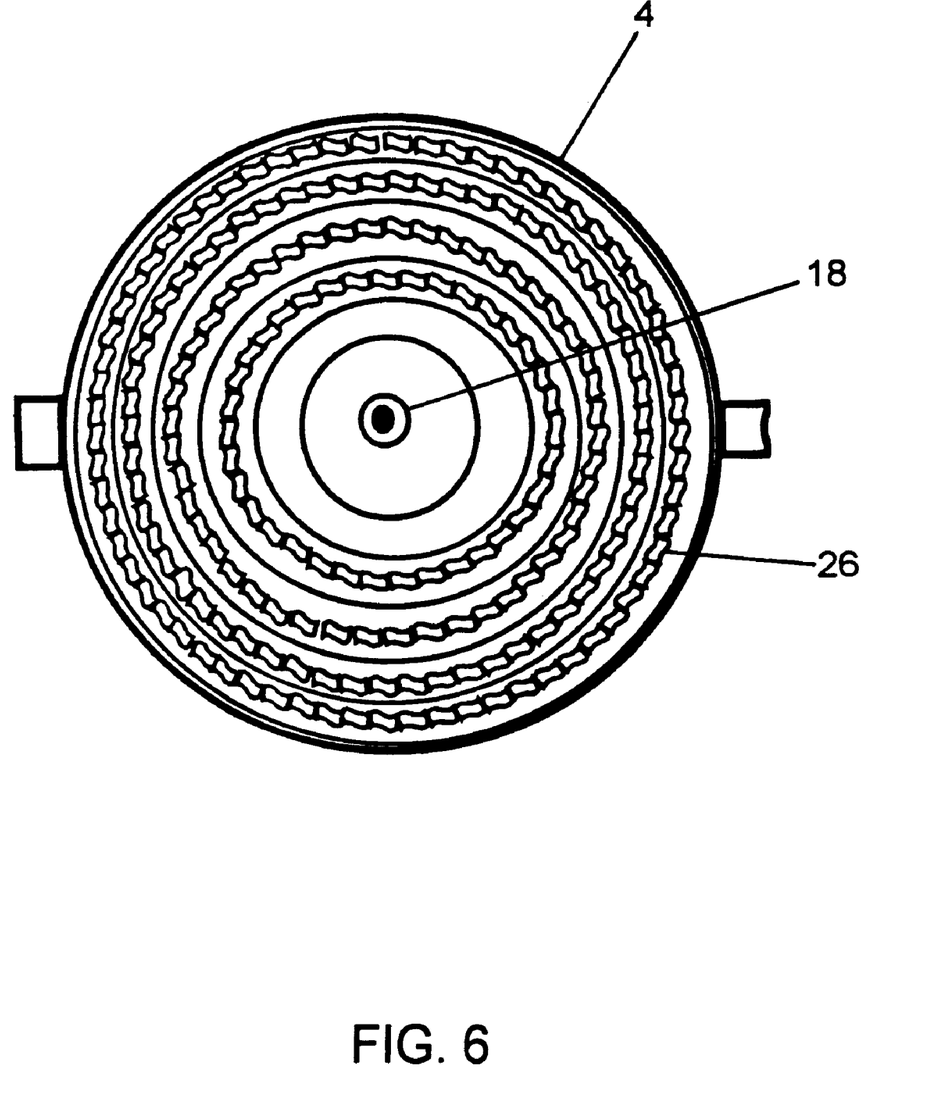
FIG. 6 illustrates a top view of either a pull-up or push-up embodiment of the signal device with a transparent lid to show the main food bait, rolled cardboard, placed around the signal device.

FIG. 6 illustrates a top view of either of the above embodiments with a transparent lid 22 to show the placement of extra food 26, for example, rolled cardboard, around the signal device. In the preferred embodiment, the lid would normally be made of an opaque material.

The advantages of the described signal device are many: (1) the device can be adapted to be placed in almost any form of monitor or bait station that is commercially available; (2) once the device is placed in a monitoring station, the monitoring station can be placed level with the ground or slightly below the ground, and will not interfere with people or lawn mowers moving across the surface; (3) for a monitoring station placed above ground, the housing can be dark or opaque since this device does not require one to visually examine the inside of the housing for termite activity; (4) the signal device placed in a monitor or bait station is a simple, inexpensive, and easy device to place around or in a house or other structure, including trees; (5)

the monitoring station can be used as a bait station once termites are detected by replacing the main food attractant with a toxic bait; and (6) the homeowner can immediately see and recognize the visual signal, which indicates the presence of termites or a need to replace the monitor or bait station (for example, due to fungal destruction of the food trigger), and is not as dependent on periodic, usually monthly, inspections by trained personnel.

The monitor or bait station housing and lid can be manufactured or bought commercially. The signal device is easily adapted for almost any commercially available monitor or bait station. The shape and the size of the components of the signal device can be varied as long as the triggering mechanism is proportionately varied. The housing and lid, especially for above-ground placement, can be dark or opaque, restricting the influx of light and making the device more attractive to termites.

The food trigger can be made from any material edible by termites and capable of withstanding the force exerted by the elastic member. The preferred food trigger is wood, preferably cut against the grain. The most preferred wood is pine. Additionally, an attractant, such as aspartic acid, may be coated on the food trigger. The sensitivity of the signal device can be varied by adjusting the size and material of the food trigger.

The elastic member in the pull-up embodiment of the signal device is preferably an extension spring that, upon relaxation, exerts sufficient pulling force to pull the signal support and visual indicator above the housing. The elastic member in the push-up embodiment of the signal device is preferably a compression spring that, upon relaxation, exerts sufficient force upward to push the signal support and visual indicator up through the lid of the housing. The sensitivity of the signal device can also be adjusted by changing the strength of the elastic member, which in turn will change the upward force exerted on the food trigger by the energized elastic member.

The main food bait may include sections of wood, saw dust, corn cob grit, pecan hulls, paper, or other cellulose-based material. A preferred main food bait is rolled corrugated cardboard. Additives to the food bait may include attractants, termiticides, preservatives, and humectants.

The visual signal, comprising a signal support and optionally a visual indicator, can be made from any material that is not easily eaten by termites, e.g., plastic. The length of the signal support must be short enough that the device fits within the interior of the monitor housing and long enough that, upon triggering, a signal is seen above the housing.

Optionally, a visual indicator can be attached to the signal support. For example, such indicators as a flag, reflector, or bright paint, can be used to enhance the visual signal above the housing.

EXAMPLE 1

Efficacy of Various Food Triggers

A signal device was placed in a monitor as illustrated in FIGS. 1–3, with a main food supply as in FIG. 6, to test the efficacy of food triggers made of various woods. Preliminary trials were conducted with food triggers made of hardwood maple dowels. The monitor with the signal device was placed in a 32-gallon trash can that housed a termite colony, *Coptotermes formosanus* Shiraki, collected from New Orleans, Louisiana. The number of days until the release of the signal was recorded.

Next, a series of experiments was conducted to find the food trigger that would result in the fastest release time. The following 64 mm (2.5") long wood samples were tested: a maple dowel (3.5 mm (1/8") diameter); 7 mm (1/4") square cut balsa wood; 7 mm (1/4") square cut mahogany; and 7 mm (1/4") square cut pine wood cut so the growth rings (or grain) ran across the stick. The monitors were placed in the same termite colony as described above and checked daily. The number of days until signal release was recorded. Results are presented in Table 1.

TABLE 1

Days to Signal Release Using Different Food Samples

| Wood sample | # Monitors | # Days until First Trigger | Mean days to trigger |
| --- | --- | --- | --- |
| Maple dowel | 2 | 13 | 22 |
| Balsa wood | 3 | 13 | 21.7 |
| Mahogany | 3 | 24 | 27.7 |
| Pine (grain cut) | 5 | 7 | 11.2 |

As shown in Table 1, the pine wood cut across the grain was the most sensitive food trigger.

The complete disclosures of all references cited in this specification are hereby incorporated by reference. In the event of an otherwise irreconcilable conflict, however, the present specification shall control.

We claim:

1. Apparatus for visually indicating the presence of wood-eating insects in a monitor or bait station, wherein the monitor or bait station comprises a housing and a lid, wherein the lid contains a hole and wherein the housing comprises a plurality of entrance holes for the insects; wherein said apparatus comprises:

(a) a food trigger, wherein said food trigger comprises material that wood-eating insects will consume;

(b) an elastic member having an energized conformation and a relaxed conformation; wherein said elastic member and said food trigger are connected to one another; and wherein said apparatus is adapted to hold said elastic member in an energized conformation when said food trigger is intact; and wherein said apparatus is adapted to allow said elastic member to return to a relaxed conformation when wood-eating insects have eaten and sufficiently weakened said food trigger; and (c) a visual signal connected to said elastic member, wherein said elastic member is adapted to hold said signal below the top of the lid when said elastic member is in an energized conformation; and wherein said elastic member is adapted to force said signal upward through the hole in the top of the lid when said elastic member is in a relaxed conformation;

wherein:

when said elastic member is in an energized conformation, and wood-eating insects enter the housing and eat and weaken said food trigger, then said elastic member will return to a relaxed conformation, forcing said visual signal upward through the hole in the lid, causing said visual signal to become visible above the lid.

2. An apparatus as in claim 1, wherein said food trigger comprises wood.

3. An apparatus as in claim 1, wherein said food trigger is selected from the group consisting of maple, pine, balsa, and mahogany.

4. An apparatus as in claim 1, wherein said food trigger comprises pine wood.

5. An apparatus as in claim 1, wherein said food trigger comprises pine wood cut so that the wood grain is perpendicular to the direction of the force exerted by the elastic member.

6. An apparatus as in claim 1, wherein an attractant is added to said food trigger.

7. An apparatus as in claim 1, wherein said elastic member comprises a spring.

8. An apparatus as in claim 1, wherein said elastic member comprises an extension spring.

9. An apparatus as in claim 1, wherein said elastic member comprises a compression spring.

10. An apparatus as in claim 1, wherein said visual signal comprises a signal support and a visual indicator.

11. A visual indicator as in claim 10, wherein said visual indicator comprises a flag.

12. A monitor for visually indicating the presence of wood-eating insects, said monitor comprising a housing, wherein said housing comprises a plurality of entrance holes for the insects; a lid, wherein the lid contains a hole; and a signal apparatus, wherein said signal apparatus comprises:

(a) a food trigger, wherein said food trigger comprises material that wood-eating insects will consume;

(b) an elastic member having an energized conformation and a relaxed conformation; wherein said elastic member and said food trigger are connected to one another; and wherein said apparatus is adapted to hold said elastic member in an energized conformation when said food trigger is intact; and wherein said apparatus is adapted to allow said elastic member to return to a relaxed conformation when wood-eating insects have eaten and sufficiently weaken said food trigger; and (c) a visual signal connected to said elastic member, wherein said elastic member is adapted to hold said signal below the top of the lid when said elastic member is in an energized conformation; and wherein said elastic member is adapted to force said signal upward through the hole in the top of the lid when said elastic member is in a relaxed conformation;

wherein:
   when said elastic member is in an energized conformation, and wood-eating insects enter the housing and eat and weaken said food trigger, then said elastic member will return to a relaxed conformation, forcing said visual signal upward through the hole in the lid, causing said visual signal to become visible above the lid.

13. A monitor as in claim 12, wherein said housing is opaque.

14. A monitor as in claim 12, wherein said lid is opaque.

15. A monitor as in claim 12, wherein said food trigger comprises wood.

16. A monitor as in claim 12, wherein said food trigger is selected from the group consisting of maple, pine, balsa, and mahogany.

17. A monitor as in claim 12, wherein said food trigger comprises pine wood.

18. A monitor as in claim 12, wherein said food trigger comprises pine wood cut so that the wood grain is perpendicular to the direction of the force exerted by the elastic member.

19. A monitor as in claim 12, wherein an attractant is added to said food trigger.

20. A monitor as in claim 12, wherein said elastic member comprises a spring.

21. A monitor as in claim 12, wherein said elastic member comprises an extension spring.

22. A monitor as in claim 12, wherein said elastic member comprises a compression spring.

23. A monitor as in claim 12, wherein said visual signal comprises a signal support and a visual indicator.

24. A visual indicator as in claim 22, wherein said visual indicator comprises a flag.

* * * * *